US007650671B2

(12) United States Patent
Lee

(10) Patent No.: US 7,650,671 B2
(45) Date of Patent: Jan. 26, 2010

(54) SLIDE HINGE MODULE AND SLIDE TYPE EQUIPMENT UTILIZING THE SAME

(75) Inventor: Han Sang Lee, 2007, SK Leaders View, 168, Dogok-dong, Gangnam-gu, Seoul (KR) 135-270

(73) Assignees: P & Tel Inc., Seoul (KR); Han Sang Lee, Seoul (KR)

( * ) Notice: Subject to any disclaimer, the term of this patent is extended or adjusted under 35 U.S.C. 154(b) by 0 days.

(21) Appl. No.: 12/163,482

(22) Filed: Jun. 27, 2008

(65) Prior Publication Data
US 2009/0007383 A1    Jan. 8, 2009

(30) Foreign Application Priority Data
Jul. 4, 2007    (KR) ............... 10-2007-0066955

(51) Int. Cl.
*E05D 15/00* (2006.01)

(52) U.S. Cl. ........................................................ 16/362
(58) Field of Classification Search .................. 16/362, 16/364, 239, 351, 352, 345, 326, 258, 86.2, 16/93 R, 246, 363; 361/679.05, 679.3, 679, 361/56, 679.12, 679.39; 49/66, 176; 248/222.13, 248/222.51, 222.52, 221.11; 292/194, 219, 292/113, 247; 455/575.1, 575.3, 575.4; 399/125, 399/380
See application file for complete search history.

(56) References Cited

U.S. PATENT DOCUMENTS
2007/0058330 A1* 3/2007 Lin ............................ 361/681
(Continued)

FOREIGN PATENT DOCUMENTS
JP    2005-61559 A    3/2005
(Continued)

*Primary Examiner*—Victor Batson
*Assistant Examiner*—Matthew Sullivan
(74) *Attorney, Agent, or Firm*—Roberts Mlotkowski Safran & Cole, P.C.; Thomas W. Cole

(57) ABSTRACT

A slide hinge module of a slide-type device, which includes: a hinge assembly, in which a connecting member having a locking part and a guide member having a guide part are foldably assembled with each other, and elastic force is exerted to the hinge assembly in a direction where the connecting member and the guide member are unfolded from each other by an elastic member; a slide member assembled with the guide part so as to slide, the slide member having one end at which a swing operating part is formed; and a swing member including a locking jaw which is rotatably installed at the guide member and is locked in the locking part or is released from the locking part according to a rotational angle, the swing member including a swing-trigger part, which is locked in the swing operating part according to a movement position of the slide member and is rotated so as to allow the locking jaw to be released from the locking part, or is released from the swing operating part and is rotated in an inverse direction so as to allow the locking jaw to be locked in the locking part. While the slide member slides along the guide part, the locking jaw catches torque of a hinge spring so that large amounts of frictional force due to the hinge spring aren't generated between the guide member and slid member. Therefore, the slide member can smoothly slide.

21 Claims, 14 Drawing Sheets

U.S. PATENT DOCUMENTS

| | | | |
|---|---|---|---|
| 2008/0052874 A1* | 3/2008 | Liu | 16/246 |
| 2008/0081505 A1* | 4/2008 | Ou et al. | 439/374 |
| 2008/0174942 A1* | 7/2008 | Yang et al. | 361/680 |
| 2008/0304215 A1* | 12/2008 | Chiu | 361/681 |

FOREIGN PATENT DOCUMENTS

| | | |
|---|---|---|
| JP | 2007-74411 A | 3/2007 |
| KR | 10-0619183 B1 | 8/2006 |
| KR | 10-0675731 B1 | 1/2007 |
| KR | 10-2007-0021728 A | 2/2007 |

* cited by examiner

SLIDE HINGE MODULE AND SLIDE TYPE EQUIPMENT UTILIZING THE SAME

BACKGROUND OF THE INVENTION

1. Field of the invention

The present invention relates to a slide hinge module and a slide-type device using the same, and more particularly to a slide hinge module applied to a portable terminal having a first body part and a second body part, which slides on the first body part and is erected while having a slant with a predetermined angle, and a slide-type device, such as a slide-type portable terminal, etc., using the slide hinge module.

In general, "portable terminals" are personal portable terminals, such as a PDA, a cellular phone, a electronic calculating machine, a portable game apparatus, a desktop computer, an electronic note book, etc., which allow a user to perform communication, play a game, view Internet, watch TV, perform calculation, etc., while the user carries it.

According to an operation principle, the portable terminals are classified into slide-type portable terminals and folder type portable terminals. The present invention relates to the slide-type portable terminal among these.

2. Description of the Prior Art

In general, a portable terminal employing a slide-type opening/closing manner has a first body part having a button installed therein and a second body part including a display unit installed thereon, which are assembled with each other in such a manner that the second body part can slide on the first body part while facing the first body part in parallel. In such a portable terminal, after sliding the second body part on the first body part in parallel, in order to erect the slid second body part while having a slant at a predetermined angle, a torsion spring, etc. have to be installed at a connecting part for rotation of the first body part and the second body part so as to provide rotational force to the first body part.

In the slide-type portable terminal having such a structure, while the second body part is moved on the first body part in parallel, rotating torque caused by a hinge spring, etc. is operated between the second body part and a part for guiding slide movement of the second body part. Therefore, scratches or large amount of frictional force between contact parts are generated. As a result, slide movement of a slide member can not be smoothly performed.

SUMMARY OF THE INVENTION

Accordingly, the present invention has been made to solve the above-mentioned problems occurring in the prior art, and an object of the present invention is to provide a slide hinge module which prevents the generation of scratches or large amounts of frictional force due to rotational force between a slide member and a guide member for sliding while the slide member slides, so that a sliding operation of the slide member can be smoothly performed.

The present invention is to provide a slide-type device, which prevents the generation of scratches or large amounts of frictional force due to rotational torque between a slide member and a guide member for sliding while a second body part slides on a first body part, so that sliding operation of the slide member can be smoothly performed.

In order to accomplish this object, there is provided a slide hinge module, which includes: a hinge assembly, in which a connecting member having a locking part and a guide member having a guide part are foldably assembled with each other, and elastic force is exerted to the hinge assembly in a direction where the connecting member and the guide member are unfolded from each other by an elastic member; a slide member assembled with the guide part so as to slide, the slide member having one end at which a swing operating part is formed; and a swing member including a locking jaw which is rotatably installed at the guide member and is locked in the locking part or is released from the locking part according to a rotational angle, the swing member including a swing-trigger part, which is locked in the swing operating part according to a movement position of the slide member and is rotated so as to allow the locking jaw to be released from the locking part, or is released from the swing operating part and is rotated in an inverse direction so as to allow the locking jaw to be locked in the locking part.

It is preferable that a first through hole is formed at the connecting member, the locking part is formed at one side of the through hole, a second through hole is formed at the guide member so as to allow the swing member to pass through the second through hole to be positioned toward the connecting member, the connecting member and the guide member are assembled with each other in such a manner that they can rotate about a hinge shaft, and the connecting member and the guide member are provided with elastic force in a direction where they are unfolded from each other by means of a hinge spring installed at the hinge shaft.

It is preferable that, as the one end of the slide member reaches the guide member so that the swing-trigger part is locked in the swing operating part so as to be rotated, the swing member allows the locking jaw to be released from the locking part so as to be in a unfold angle state where the guide member to be unfolded from the connecting member, and the slide member is moved after the guide member is folded on the connecting member due to external force in the unfold angle state, the swing-trigger part rotates in an inverse direction while being released from the swing operating part so as to allow the locking jaw to be locked in the locking part to be in a locking angle state so that a state where the guide member is folded on the connecting member is maintained, and as a result, the slide member can slide along the guide part regardless of an effect of force exerted by the hinge spring.

It is preferable that the guide part is a T-shaped groove, the swing member is installed in such a manner that the swing member can rotate about a rotational shaft perpendicular to the guide member, and the swing operating part is formed at a side wall of the slide member, the side wall extending toward the guide member.

As the case may be, it is possible that the swing member is installed in such a manner that the swing member can rotate about a rotational shaft arranged on a bottom surface of the guide part in a direction parallel with the bottom surface of the guide member, and the swing operating part is formed at a bottom surface of the slide member.

In accordance with another aspect of the present invention, there is provided a slide-type device, which includes: a first body part; a second body part, which can slide on the first body part in parallel, the second body part can be bent with a slant respective to the first body part at one end of the first body part; a hinge assembly, in which a connecting member and a guide member are foldably assembled with each other, the connecting member having a locking part formed thereon, the guide member having a guide part formed thereon, and elastic force is exerted to the hinge device in a direction where the connecting member and the guide member are unfolded from each other by an elastic member; a slide member, which is connected with the second body and is assembled with the guide part so as to slide, the slide member having one end at which a swing operating part is formed; and a swing member including a locking jaw, which is rotatably installed at the guide member and is locked in the locking part or is released from the locking part according to a rotational angle, the swing member including a swing-trigger part, which is locked in the swing operating part according to a movement position of the slide member and is rotated so as to allow the locking jaw to be released from the locking part, or is released from the swing operating part and is rotated in an inverse direction so as to allow the locking jaw to be locked in the locking part.

The connecting member and guide member are rotatably assembled with each other by means of a rotating shaft, and the connecting member and the guide member are provided with elastic force in a direction where they are unfolded from each other by means of a hinge spring installed at the hinge shaft.

It is preferable that, as the one end of the slide member reaches the guide member so that the swing-trigger part is locked in the swing operating part so as to be rotated, the swing member allows the locking jaw to be released from the locking part so as to be in a unfold angle state where the guide member to be unfolded from the connecting member, when the slide member is moved after the guide member is folded on the connecting member due to external force in the unfold angle state, the swing-trigger part rotates in an inverse direction while being released from the swing operating part so as to allow the locking jaw to be locked in the locking part to be in a locking angle state so that a state where the guide member is folded on the connecting member is maintained, and as a result the slide member can slide along the guide part regardless effect of force exerted by the hinge spring.

The slide member may be integrally formed at the second body part.

It is preferable that the guide part is a T-shaped groove, the swing member is installed in such a manner that the swing member can rotate about a rotational shaft perpendicular to the guide member, and the swing operating part is formed at a side wall of the slide member, the side wall extending toward the guide member.

The swing member may be installed in such a manner that the swing member can rotate about a rotational shaft arranged in a direction parallel with the guide member, and the swing operating part is formed at a bottom surface of the slide member.

It is preferable that a torsion spring for pushing the first body part in a first direction or a second direction according to a movement position of the slide member is installed between the guide member and the second body part.

It is preferable that a pair of hinge assemblies, a pair of slide members, and a pair of swing members are installed with an interval.

In accordance with another aspect of the present invention, there is provided a slide hinge module, which may include a body part having a locking part and a hinge part; a guide member, which is rotatably installed at a hinge part so as to be foldably connected with the body part, and is provided with elastic force from an elastic member in a direction that the guide member is unfolded respective to the body part, the guide member having a guide part; a slide member assembled with the guide part so as to slide, the slide member having one end, at which a swing operating part is formed; and a swing member including a locking jaw, which is rotatably installed at the guide member and is locked in the locking part or is released from the locking part according to a rotational angle, the swing member including a swing-trigger part, which is locked in the swing operating part according to a movement position of the slide member and is rotated so as to allow the locking jaw to be released from the locking part, or is released from the swing operating part and is rotated in an inverse direction so as to allow the locking jaw to be locked in the locking part.

As described above, in a slide hinge module and a slide-type device using the same according to the present invention, a locking jaw catches torque of a hinge spring while a slide member moves along a guide part so that scratches or large amounts of frictional force due to the torque of the hinge spring between the guide member and the slid member don't occur. Therefore, the slide movement of the slide member can be smoothly performed.

Accordingly, the slide-type device according to the present invention has a superior operational convenience, a long life span, and don't have any malfunction.

In addition, a slide hinge module and a slide-type device according to the present invention can secure high quality of PDAs, cellular phones, portable game devices, electronic note, etc.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, exemplary embodiments of the present invention will be described with reference to the accompanying drawings.

Figure 1:
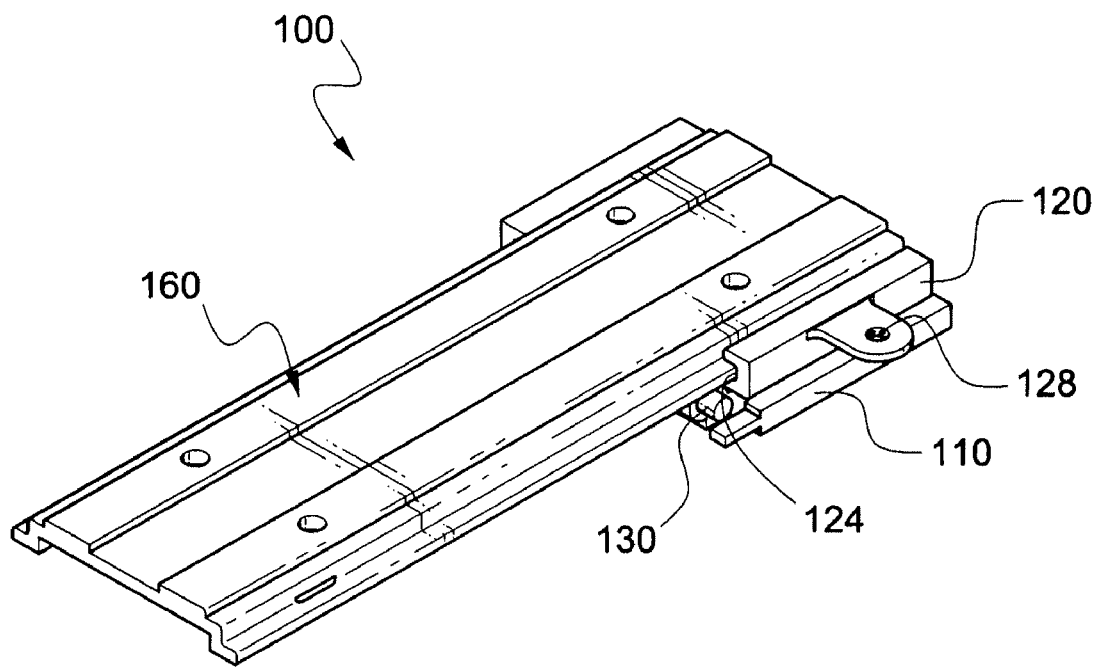
FIG. 1 is a perspective view of a slide hinge module according to the present invention.
Figure 2:
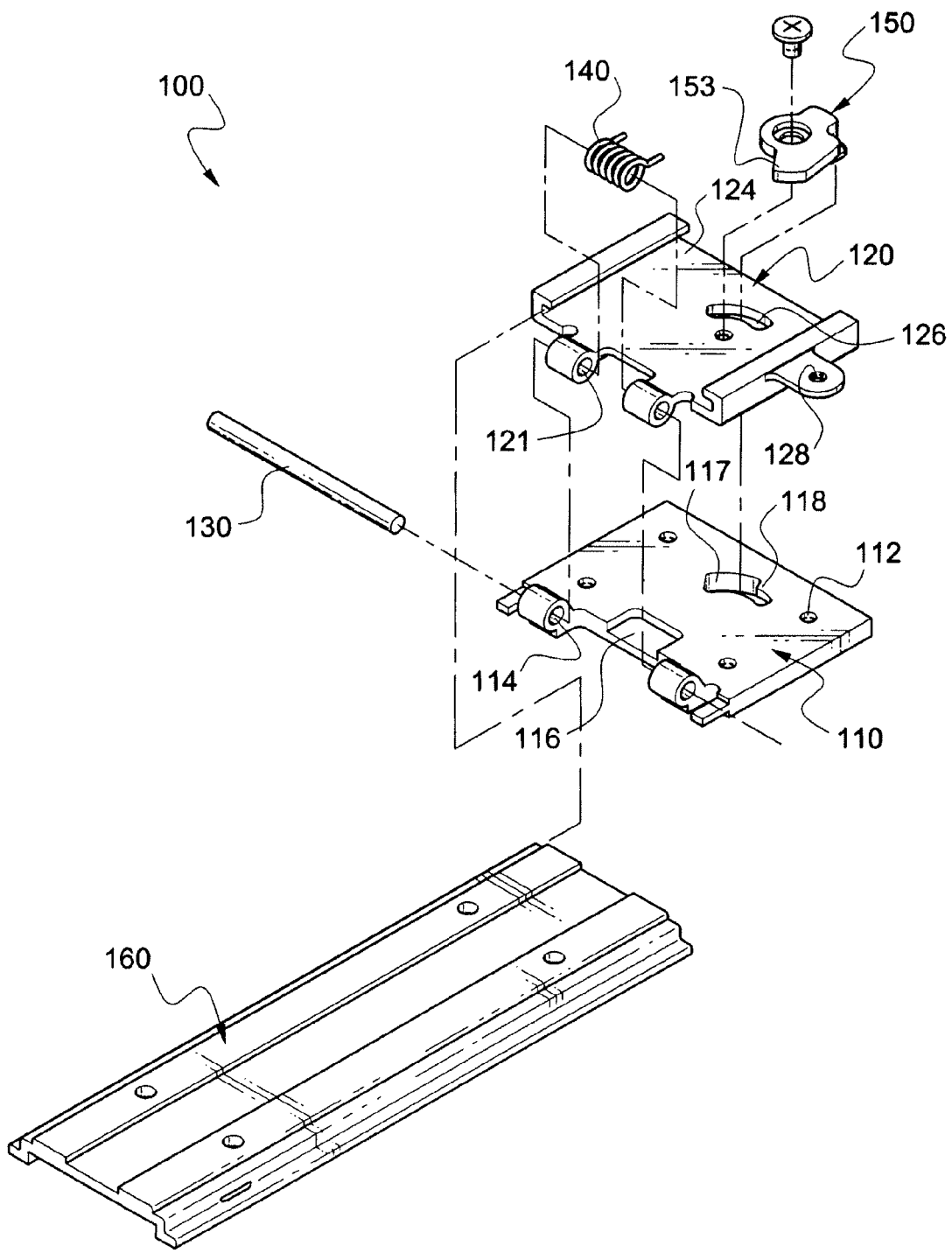
FIG. 2 is an exploded perspective view of the slide hinge module of FIG. 1.
Figure 3:
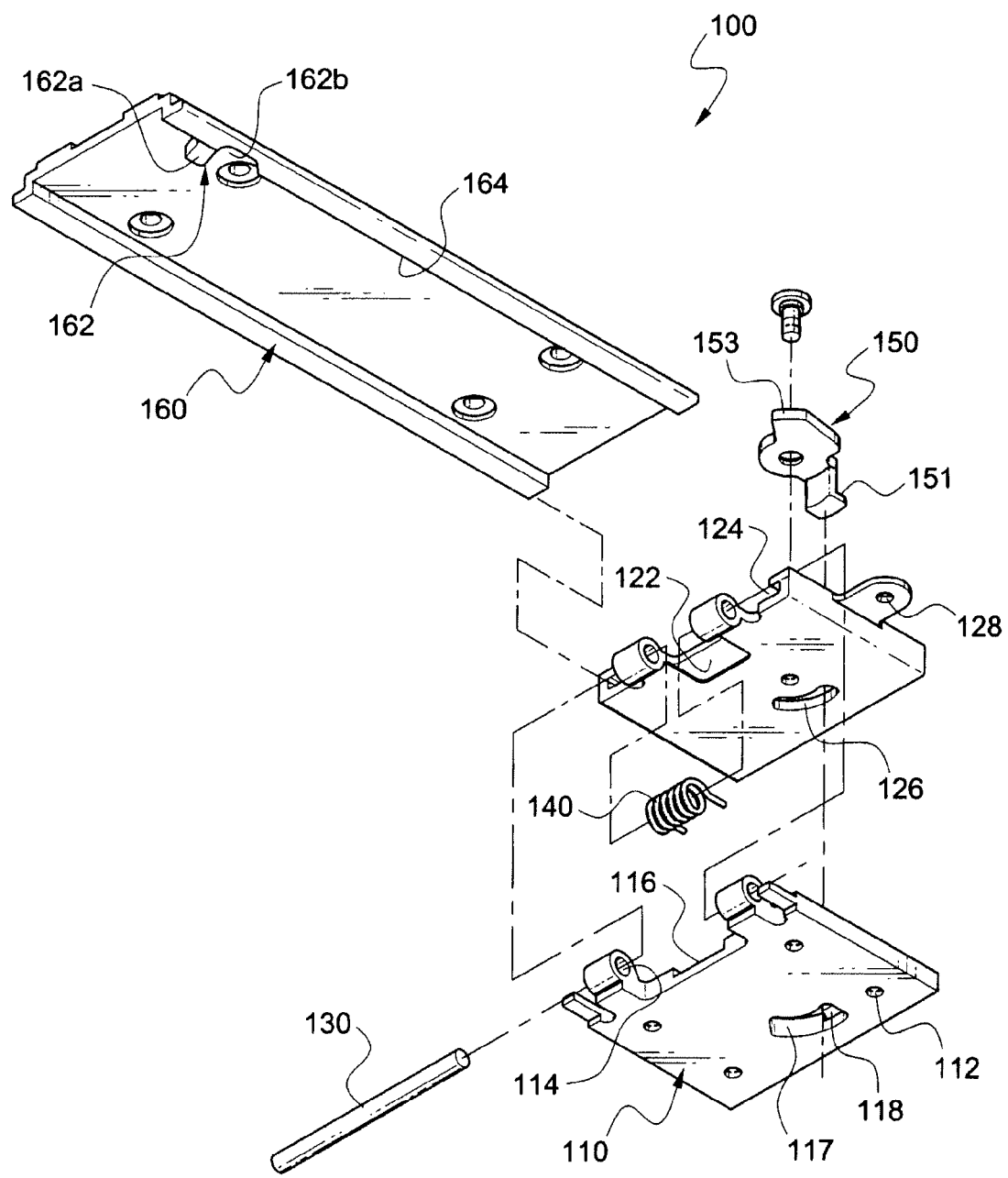
FIG. 3 is an exploded perspective view in a bottom direction of the slide hinge module of FIG. 1.

FIG. 1 is a perspective view of a slide hinge module according to the present invention, FIG. 2 is an exploded perspective view of the slide hinge module of FIG. 1, and FIG. 3 is an exploded perspective view in a bottom direction of the slide hinge module of FIG. 1.

The slide hinge module 100 according to the present invention is illustrated in FIGS. 1 to 3. As shown, the slide hinge module 100 according to the present invention includes a connecting member 110. This connecting member 110 is connected to a first body part of a slide-type device, such as a PDA, a mobile phone, etc., and includes a plurality of assembling holes 112. First hinge holes 114, with which a hinge shaft 130 can be assembled, are formed at both sides of one end of the connecting member while having an interval between them, and a connecting member recess 116 is formed on an upper surface of a middle part between the hinge holes so as to allow a hinge spring 140 to be assembled therewith. Also, a first through hole 117 and a locking part 118 are formed near to the other end of the connecting member 110. The first through hole 117 allows a part of a swing member 150, which will be described below, to be passed therethrough and to rotate within a predetermined range. The locking part 118 allows a locking jaw 151 of the rotated swing member 150 to be locked therein so as to maintain a state where the connecting member 110 and the guide member 120 are folded.

The slide hinge module 100 according to the present invention includes a guide member 120. The guide member 120 has second hinge holes 121, in which the hinge shaft 130 can be inserted, are formed at both sides of one end thereof while having an interval. This guide member 120 is foldably connected with the connecting member 110 through the hinge shaft 130, and has a guide member recess 122, with which the other end of the hinge spring 140 is assembled, formed at a lower surface near a central part between the second hinge holes 122. Such a guide member 120 has a guide part 124. The guide part 124 is formed as a groove with a T-shape. It can be easily understand that the shape of the guide part 124 can be variously changed. As the case may be, the shape of a part to be guided by the guide member 124 and the shape of the guide member can be exchanged with each other. A second through hole 126 is formed at the vicinity of the other end of the guide member 120, which is opposite to the second hinge hole 121. The second through hole 126 allows a part of the swing member 150, which will be described below, to pass therethrough and to rotate within a predetermined range. The torsion spring connecting hole 128 for connecting one end of the torsion spring for providing power to a body of the device is formed at one side edge of the guide member 120.

The slide hinge module 100 according to the present invention includes the hinge shaft 130 and the hinge spring 140. The hinge shaft 130 is inserted into the first hinge hole 114 and the second hinge hole 121 so as to allow the connecting member 110 and the guide member 120 to be folded and unfolded about the hinge shaft 130.

The hinge spring 140 is coupled with the hinge shaft 130 so that one end of the hinge spring is engaged in the connecting member recess 116 and the other end thereof is engaged in the guide member recess 122, thereby generating torque in a direction in which the connecting member 110 and the guide member 120 are unfolded from each other.

A structure, in which the connecting member 110, the guide member 120, and the hinge shaft 130, which are described above, are assembled with each other, function as a hinge assembly.

The slide hinge module 100 according to the present invention includes the swing member 150. The swing member 150 is installed at the guide member 120 and can rotate about a rotational shaft perpendicular to a surface of the guide member 120. This swing member 150 includes a locking jaw 151, which passes through the second through hole 126 so as to be inserted into the first through hole 117 and has one end bent toward one side so as to be locked in the locking part 118 or to be unlocked therefrom according to a rotation angle. The swing member 150 also include a swing-trigger part 153, which rotates while being locked in the swing operating part 162 according to a movement position of the slide member 160 so as to allow the locking jaw 151 to be unlocked from the locking part 118, or inversely rotates while being unlocked from the swing operating part 162 so as to allow the locking jaw 151 to be locked in the locking part 118.

The slide hinge module 100 according to the present invention includes a slide member 160. The slide member 160 is coupled with the guide part 124 of the guide member 120 so as to slide, and is a part connected with the second body part of the slide-type device. It is preferable that the slide member 160 has both side walls 164, which are formed along edges of both sides of a bottom surface thereof and have each end extending outward, so that an empty space is formed between the side member 160 and a bottom surface of the guide member 120 when the slide member 160 is assembled with the guide part 124 of the guide member 120. As shown, a swing operating part 162 is formed at the side wall of one end of the slide member 160. The swing operating part 162 allows the swing member 150 to rotate at a position where the swing member 150 meets the swing operating part 162 in such a manner that the swing-trigger part 153 of the swing member 150 is stopped by the swing operating part 162.

In a state where such components are assembled with each other as shown in FIG. 1, as one end of the slide member 160 reaches the guide member 120 so that the swing-trigger part 153 is locked in the swing operating part 162 and is rotated, the swing member 150 allows the locking jaw 151 to be unlocked from the locking part 118 to be in an unfolded angle state where the guide member 120 is unfolded from the connecting member 110, and when the slide member 160 is moved after the guide member 120 is folded on the connecting member 110 due to external force in the unfold angle state, the swing-trigger part 153 rotates in an inverse direction while being released from the swing operating part 162 so as to allow the locking jaw 151 to be locked in the locking part 118 to be in a locking angle state so that a state where the guide member 120 is folded on the connecting member 110 is maintained, and as a result, the slide member 160 can slide along the guide part 124 regardless of effect of torque exerted from the hinge spring 140.

Herein, the swing operating part 162 includes a protuberance 162a extending from the side surface and a groove 162b so as to allow the swing member 150 to rotate in a clockwise direction or a counter clockwise direction. However, as the case may be, it is possible to add a spring. Therefore, in a case where force is exerted to the swing member 150 in one rotational direction, the length of the swing operating part 153 can be short, and the swing operating part 162 can be constituted of only the protuberance 162a.

Figure 4:
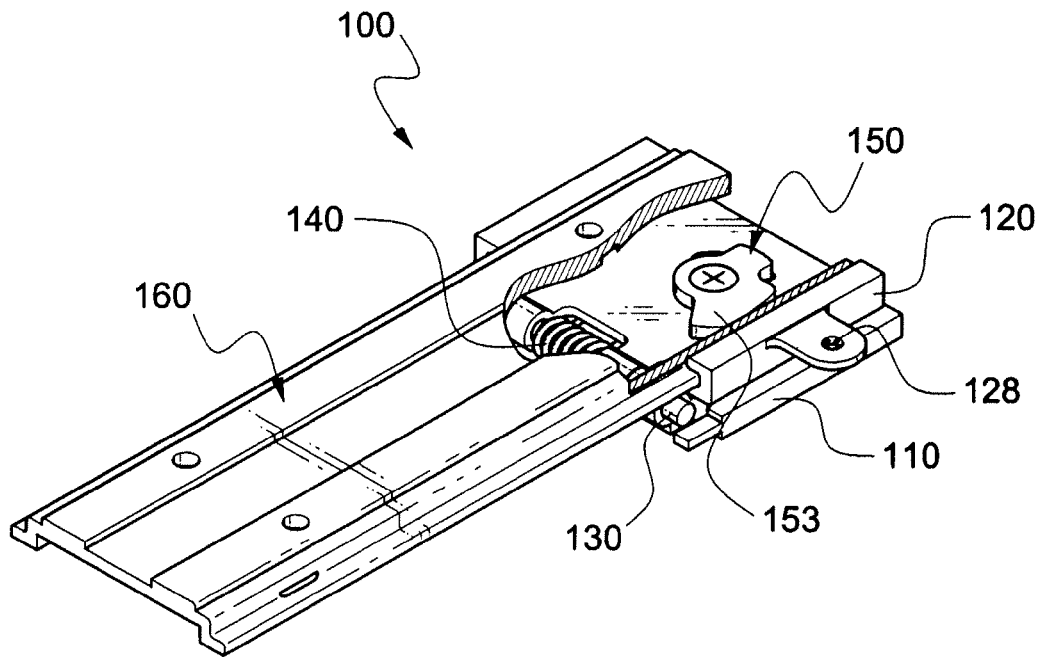
FIG. 4 is a cut-away perspective view showing an assembled state of the interior of the sliding hinge module of FIG. 1.
Figure 5:
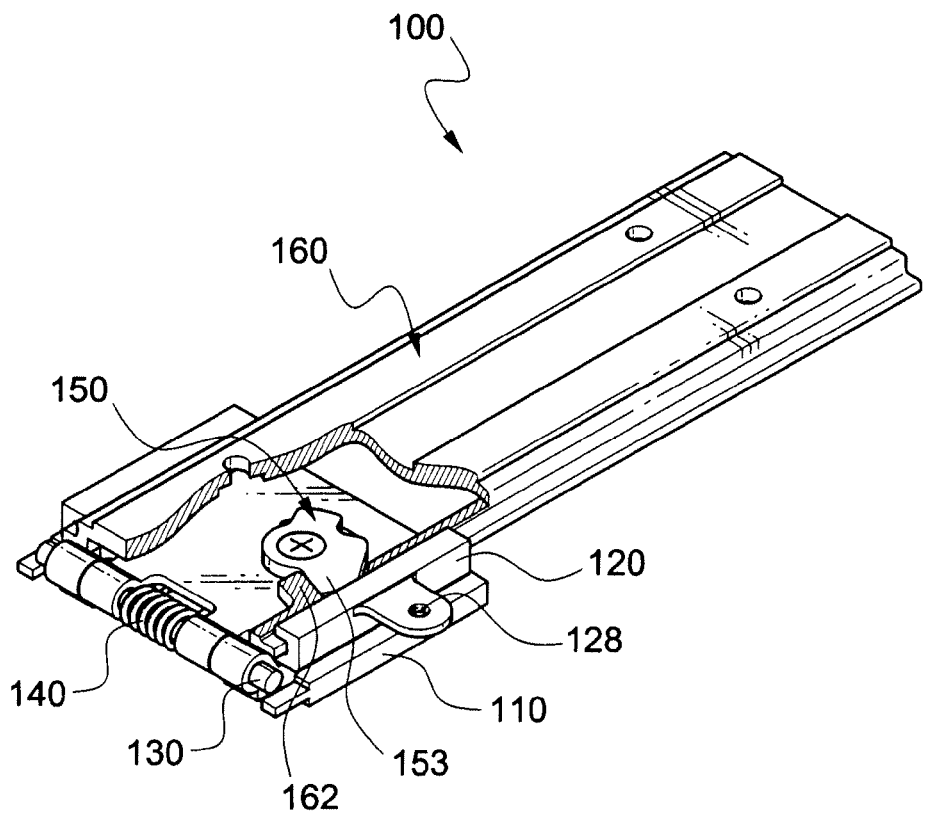
FIG. 5 is a cut-away perspective view of the sliding hinge module, in which a slide member is moved so as to be unfolded.
Figure 6:
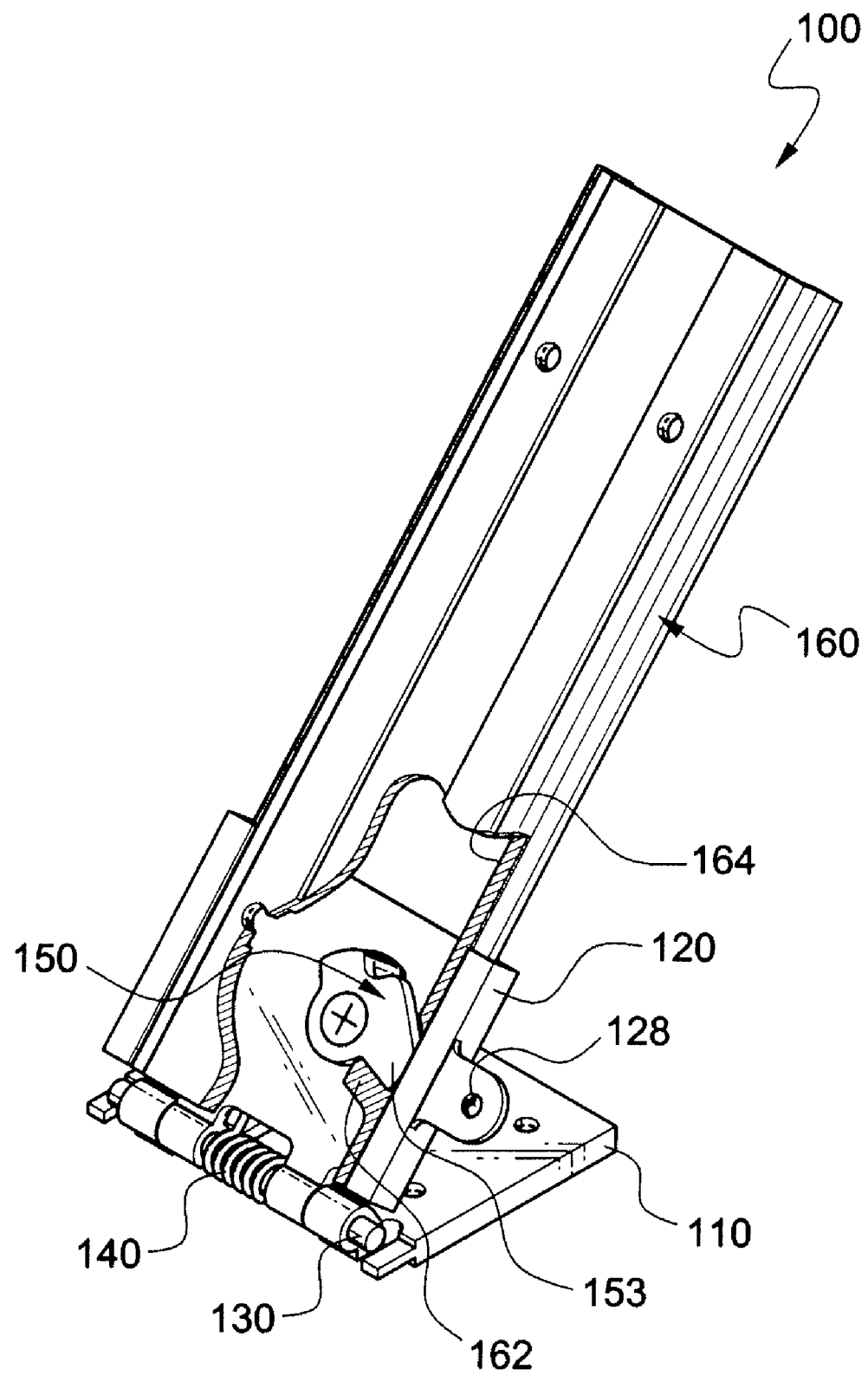
FIG. 6 is a cut-away perspective view illustrating a state where a guide member and the slide member, which have been in a state illustrated in FIG. 5, are unfolded from each other.
Figure 7:
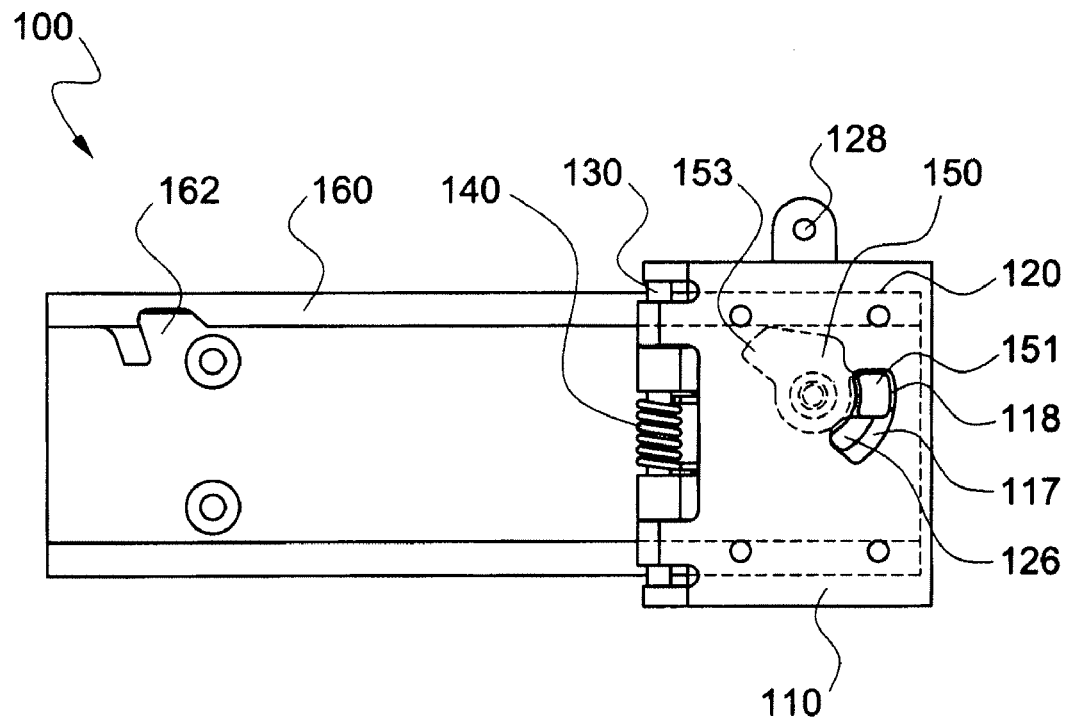
FIG. 7 is a rear view of FIG. 4.
Figure 8:
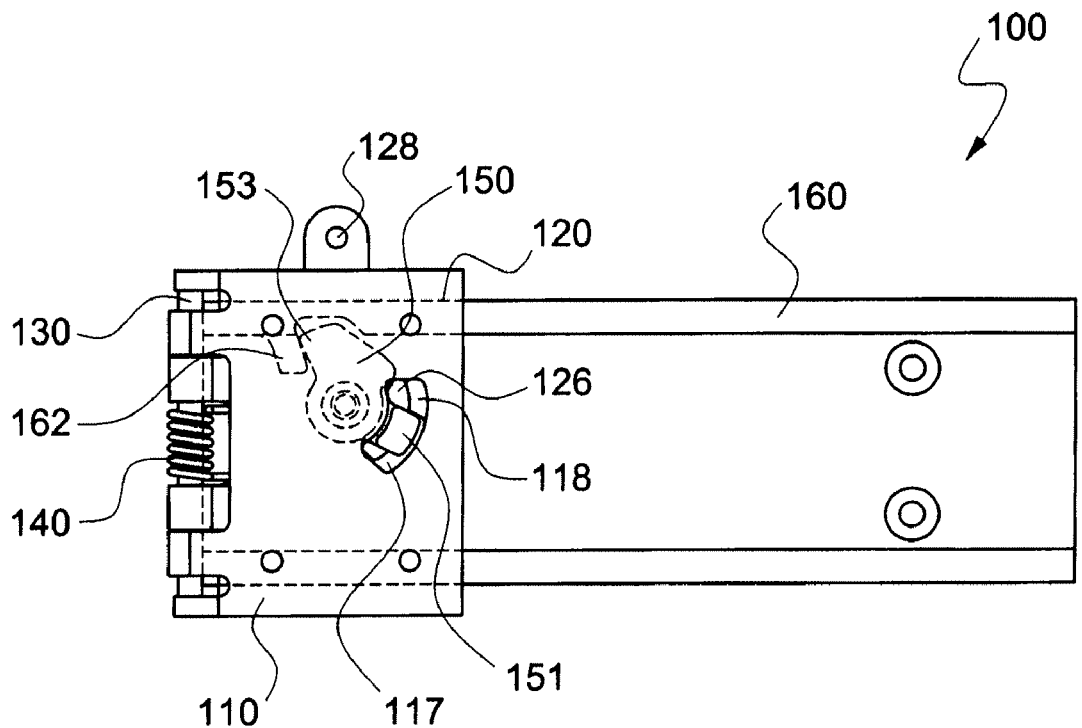
FIG. 8 is a rear view of FIG. 5.
Figure 9:
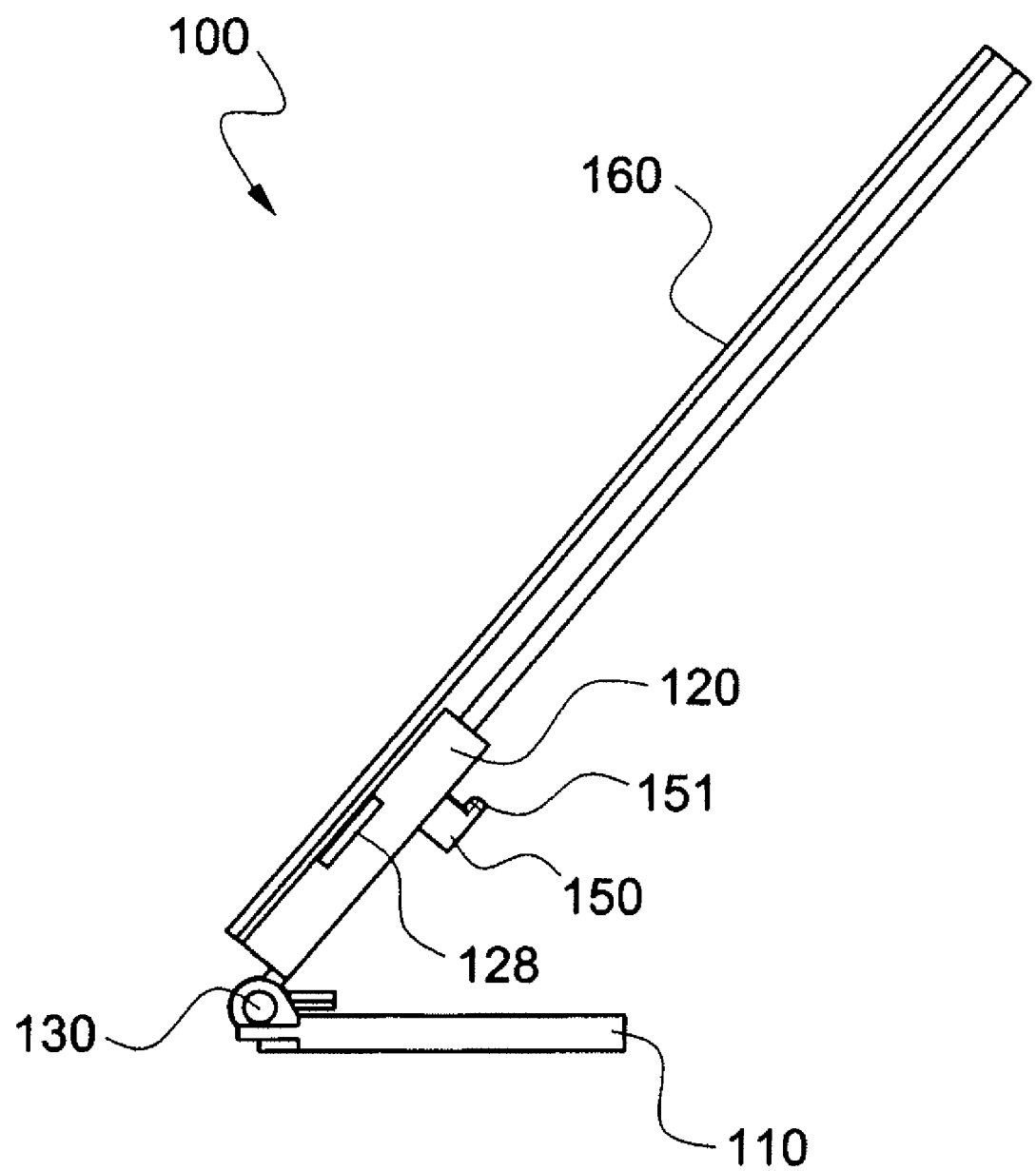
FIG. 9 is a side view of the slide hinge module of FIG. 6, in which the slide hinge module is unfolded.

FIG. 4 is a cut-away perspective view showing the assembled state of the interior of the sliding hinge module of FIG. 1, FIG. 5 is a cut-away perspective view of the sliding hinge module, in which the slide member is moved so as to be unfolded, FIG. 6 is a cut-away perspective view illustrating a state where the guide member and the slide member, which have been in a state illustrated in FIG. 5, are unfolded from each other, FIG. 7 is a rear view of FIG. 4, FIG. 8 is a rear view of FIG. 5, and FIG. 9 is a side view of the slide hinge module of FIG. 6, in which the slide hinge module is unfolded.

FIGS. 4 and 7 show the folded state. One end of the slide member 160 is assembled with the guide member 120. In this state, the swing-trigger part 153 of the swing member 150 makes contact with the side wall 164 of the slide member 160 and rotates in one side. Accordingly, the locking jaw 151 of the swing member 150 is locked in the locking part 118 of the connecting member 110.

As shown in FIGS. 5 and 8, when the slide member 160 is moved so that the other end of the slide member 160 reaches the guide member 120, the swing-trigger part 153 of the swing member 150 is locked in the swing operating part 162 so as to rotate. Accordingly, the locking jaw 151 of the swing member 150 rotates in a direction where the locking jaw 151 is released from the locking part 118 of the connecting member 110.

When the swing-trigger part 153 of the swing member 150 is locked in the swing operating part 162 so as to completely rotate in a clockwise direction, the locking jaw 151 of the swing member 150 is completely released from the locking part 118 of the connecting member 110. Accordingly, as shown in FIGS. 6 and 9, as a case where there is no external force, the connecting member 110 and guide member 120 are unfolded from each other due to force of the hinge spring 140 as shown in FIGS. 6 and 9. The slide member 160, together with the guide member 120, is unfolded from the connecting member 110.

Figure 10:
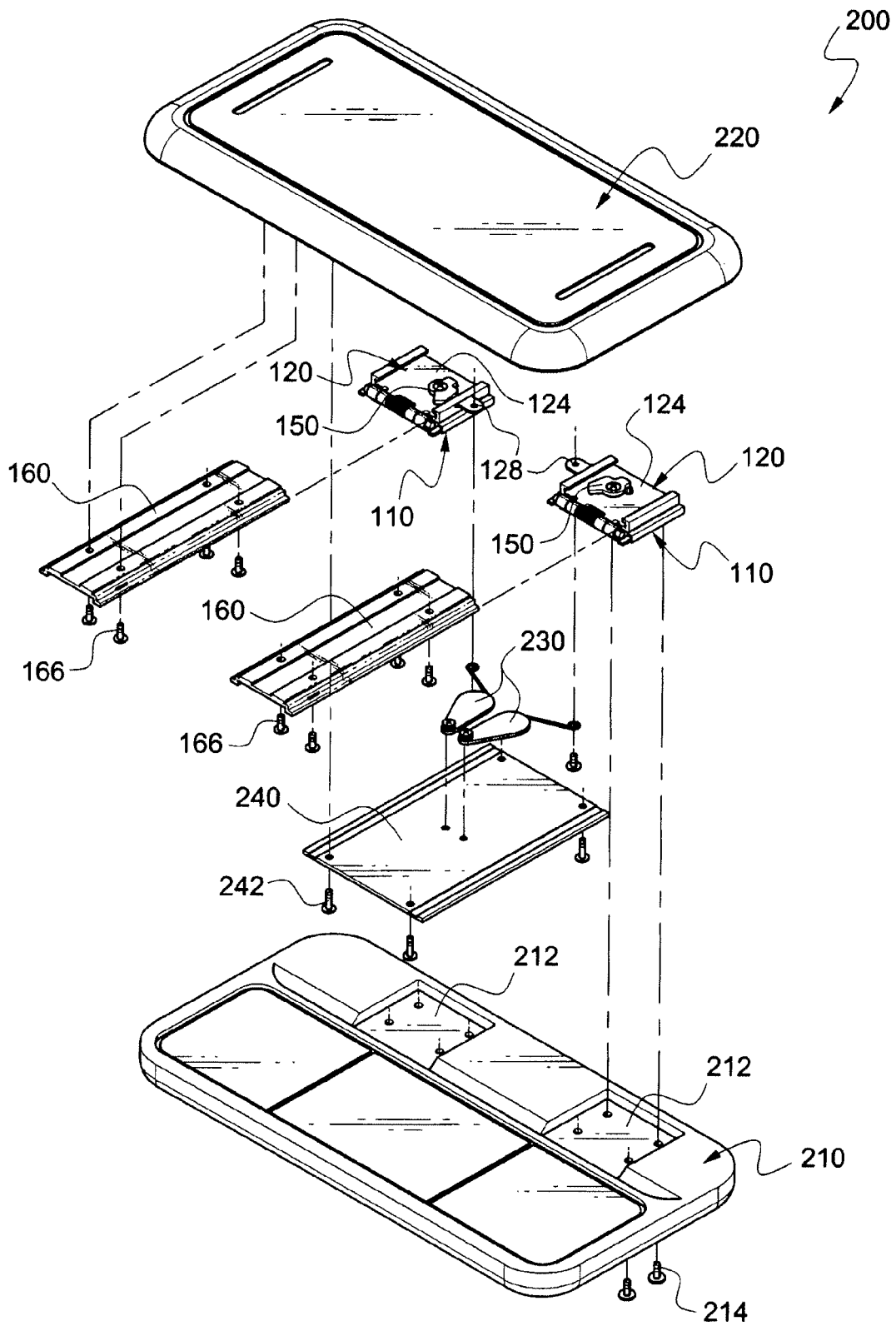
FIG. 10 is an exploded perspective view of a slide-type device according to the present invention.
Figure 11:
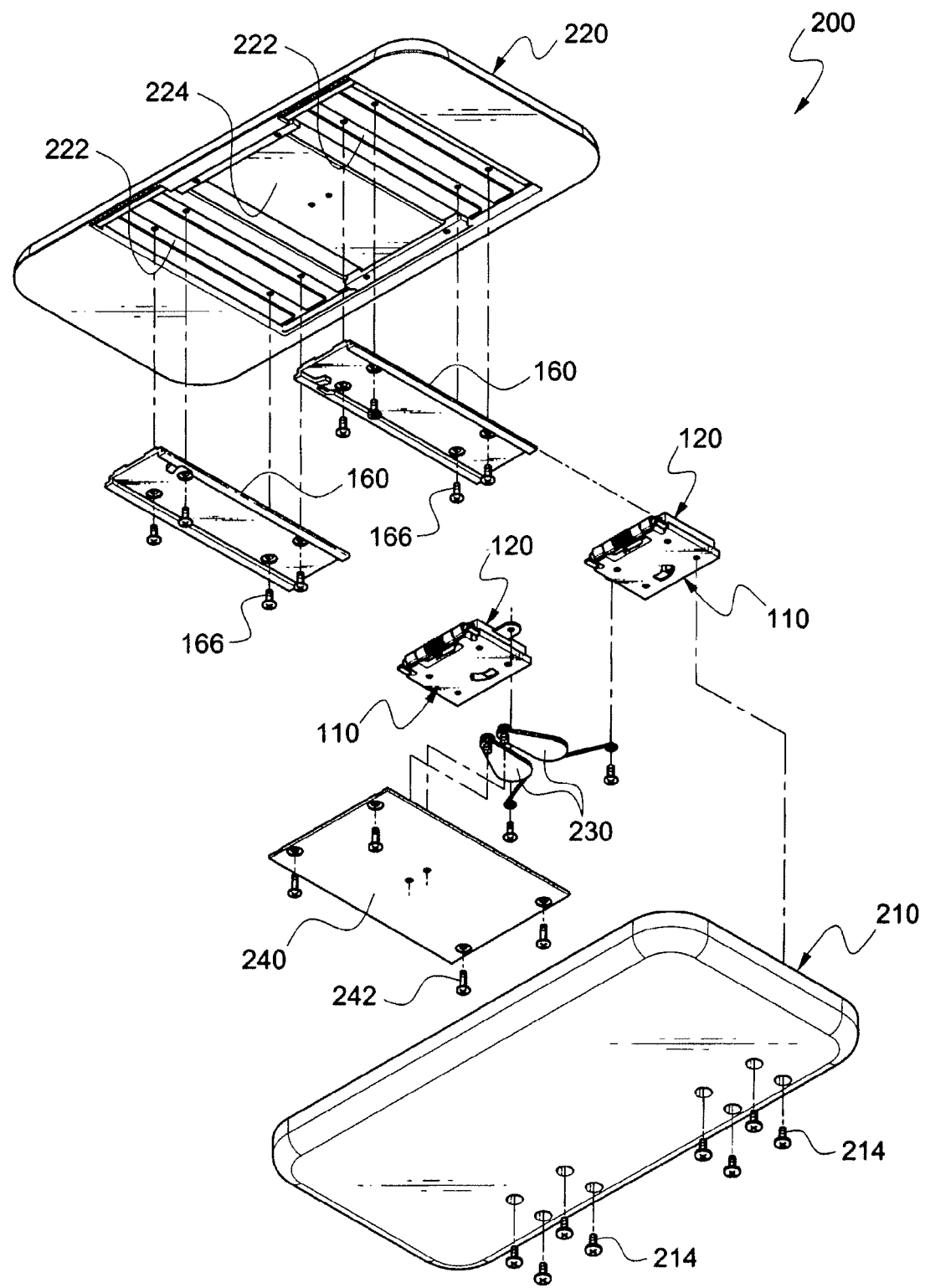
FIG. 11 is an exploded perspective view in a bottom direction of FIG. 10.

FIG. 10 is an exploded perspective view of the slide-type device according to the present invention, and FIG. 11 is an exploded perspective view in a bottom direction of FIG. 10.

As shown in FIGS. 10 and 11, the slide-type device 200 according to the present invention includes a first body part 210. The first body part 210 may be a main body of the slide-type device, such as a PDA, a mobile telephone, etc., and may be a part in which input keys or buttons are mainly installed. The first body part 210 has assembling accesses 212 for assembling the connecting member 110 formed thereon with an interval between them. The connecting member 110 is assembled in the assembling accesses 212 through screws 214, etc.

The slide-type device 200 according to the present invention includes a second body part 220. The second body part 220 is a part in which a display of a slide-type device, such as a PDA, a mobile telephone, etc. is mainly installed. The second body part 220 has mounting grooves 222 for fixing the slide member 160, which are formed on a bottom surface thereof while having an interval between them, and a concave part 224 for installing the torsion spring 230 formed between mounting grooves. The slide member 160 is mounted on the mounting grooves 222 through an assembling member, such as a plurality of screws 166, etc.

In the state where the slide member 160 is assembled with the second body part 220, it is slidably assembled in the guide part 124 of the guide member 120. The slide member 160 can be integrally formed in the bottom surface of the second body part 220.

Preferably, the slide-type device 200 according to the present invention includes a torsion spring 230. The torsion spring pushes the second body part 220 in a first direction or a second direction according to a movement position of the slide member 160. The torsion spring 230 has one end rotatably connected with the torsion spring connecting hole 128 formed in the edge of the guide member 120 and the other end rotatably connected with a bottom surface of the second body part 220, preferably, through a supporting plate 240, which will be described below. The supporting plate 240 is arranged on a bottom surface of the concave part 224 so as to support the other end of the torsion spring 230 and support the bottom surface so as to prevent the middle part of the torsion spring 230 from protruding downward.

In this embodiment, it is described that a pair of the slide hinge modules was installed. However, as the case may be, it is possible that the number of slide hinge modules can be one or at least three.

Figure 12:
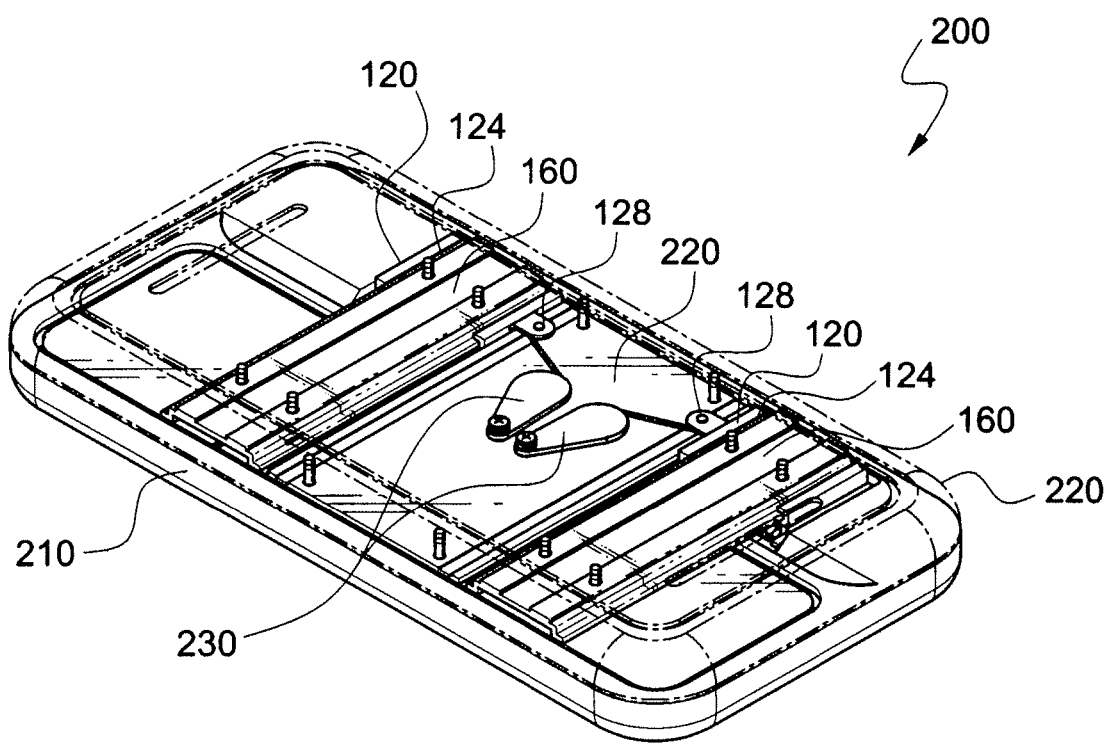
FIG. 12 is a view illustrating a closed state of a slide-type device according to the present invention.
Figure 13:
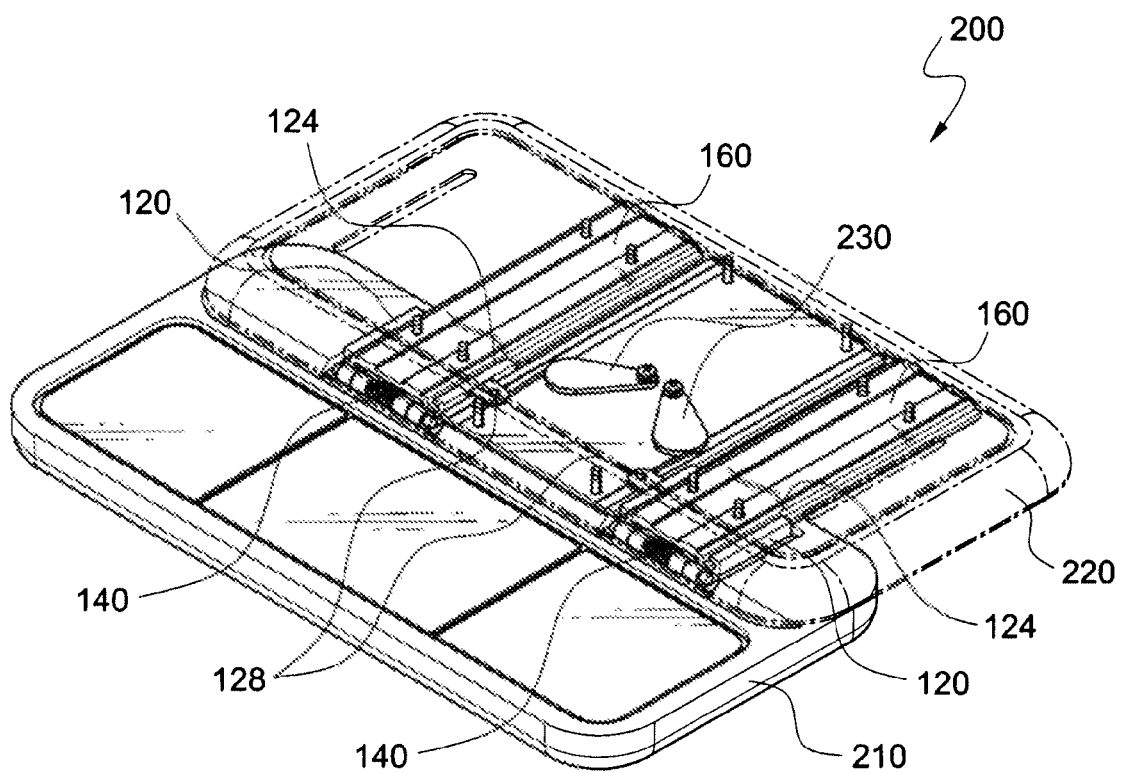
FIG. 13 is a view illustrating a state where a second body part of the slide-type device is moved.
Figure 14:
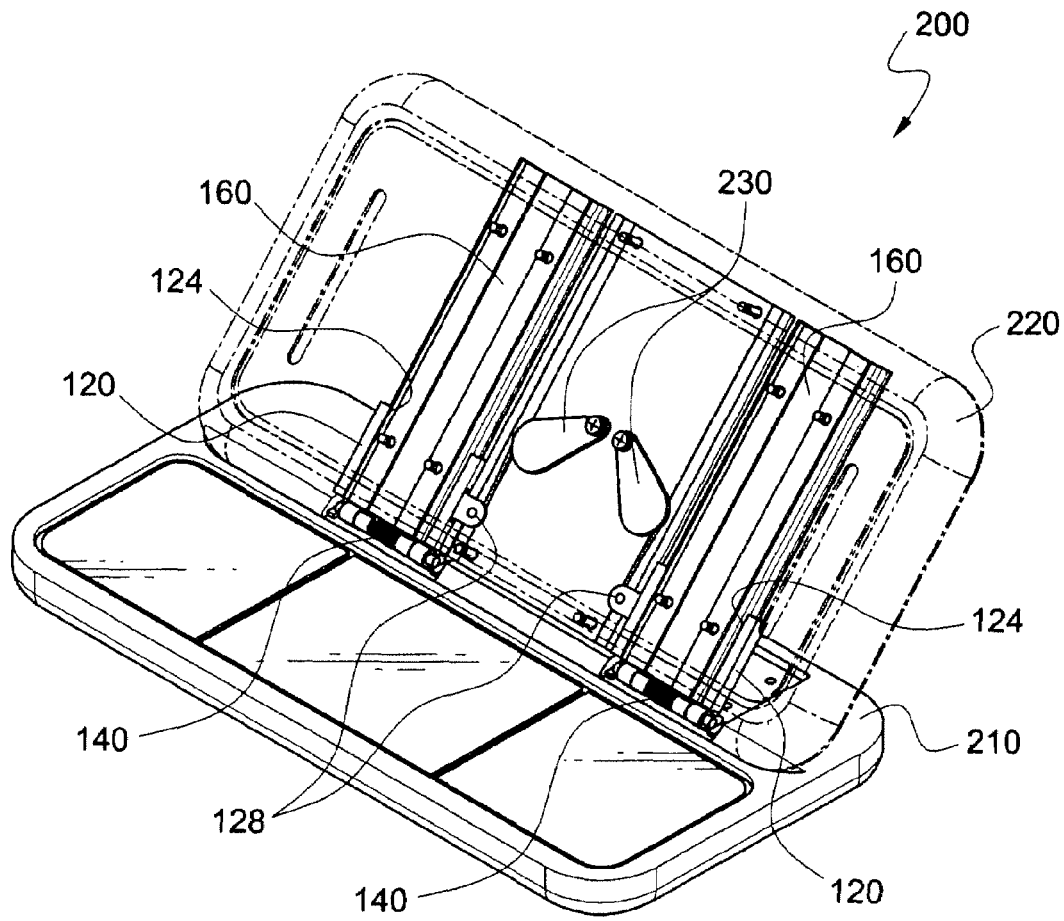
FIG. 14 is a view illustrating a state where a second body part is erected with a slant.

FIG. 12 is a view illustrating a closed state of the slide-type device according to the present invention, FIG. 13 is a view illustrating a state where the second body part of the slide-type device is moved, and FIG. 14 is a view illustrating a state where the second body part is erected with a slant.

As shown in FIG. 12, in the state where the second body part 220 is closed on the first body part 210, the upper end of the slide member 160 is assembled with the guide member 210, and one end of the torsion spring 230 connected with the torsion spring connecting hole 120 of the guide member 120 is arranged upward.

When the second body part 220 is pushed upward in the state of FIG. 12, the slide member 160 fixed in the second body part 220 moves upward under the guidance of the guide member 124. Accordingly, the second body part 220 is moved upward so as to be in the state illustrated FIG. 13. During a procedure where the slide member 160 moves from the state illustrated in FIG. 12 to the state illustrated in FIG. 13, since the locking jaw 151 of the swing member 150, which has been described above, is locked in the locking part 118 of the guide member 120, the slide member 160 smoothly slides regardless of the effect of torque from the hinge spring 140.

In the state illustrated in FIG. 12, since the torsion spring 230 exerts force downward to the second body part 220, the second body part 220 is provided with force in a downward direction so that a state where the second body part 220 is moved downward as far as possible without a clearance is maintained.

If the second body part 220 is pushed up to the middle portion of the first body part, the torsion spring 230 changes the direction that the force is applied, and exerts force in a direction where the second body part 220 is pushed upward.

When the second body part 220 is moved upward at a maximum degree, the swing-trigger part 153 of the swing member 150, which has been illustrated above, is locked in the swing operating part 162 so that the locking jaw 151 is released from the locking part 118 while the swing member 150 is rotated. Accordingly, the guide member 120 is unfolded from the connecting member 110 due to the torque of the hinge spring 140. As a result, as shown in FIG. 14, the slide member 160 and the second body part 220 are unfolded so that the second body part 220 is inclined respective to the first body part 210.

In a case where the user wants to close the slide-type device after using it in the state of FIG. 14, when the second body part 220 is pushed so as to be positioned parallel to the first body part 210, and then the second body part 220 is pulled downward at a small degree, the swing-trigger part 153 of the swing member 150, which has been described above, is released from the swing operating part 118, and rotates in a direction opposite to a initial direction. Accordingly, the locking jaw 151 is locked in the locking part 118. After the locking jaw 151 is locked in the locking part 118, the torque of the hinge spring 140 is fixed by the locking jaw 151 so that the slide member 160 smoothly slides along the guide member 124 regardless of the effect of the torque from the hinge spring 140.

Figure 15:
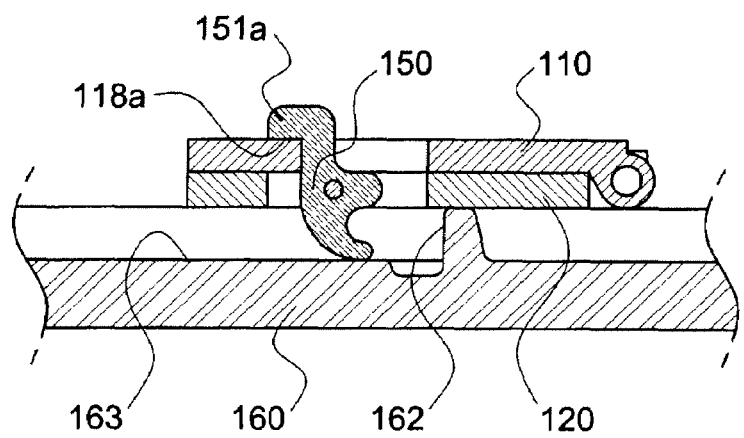
FIG. 15 is a sectional view of a part of an embodiment of the assembly where a swing member, a swing operating part, and a swing-trigger part are assembled with each other.

FIG. 15 is a sectional view of a part of an embodiment of the assembly where a swing member, a swing operating part, and a swing-trigger part are assembled with each other.

As shown in FIG. 15, as the case may be, it is possible that the swing operating part 162 is formed at a bottom part 163 of the slide member 160, and the swing member 150 is installed in such a manner that the swing member can rotate about a rotating shaft installed at a bottom 163 of the guide member 120 in parallel with a surface of the guide member 120, so that the locking jaw 151a catches or releases the locking part 118a of the connecting member 110. The maintaining operations are the same as the operation illustrated above.

Figure 16:
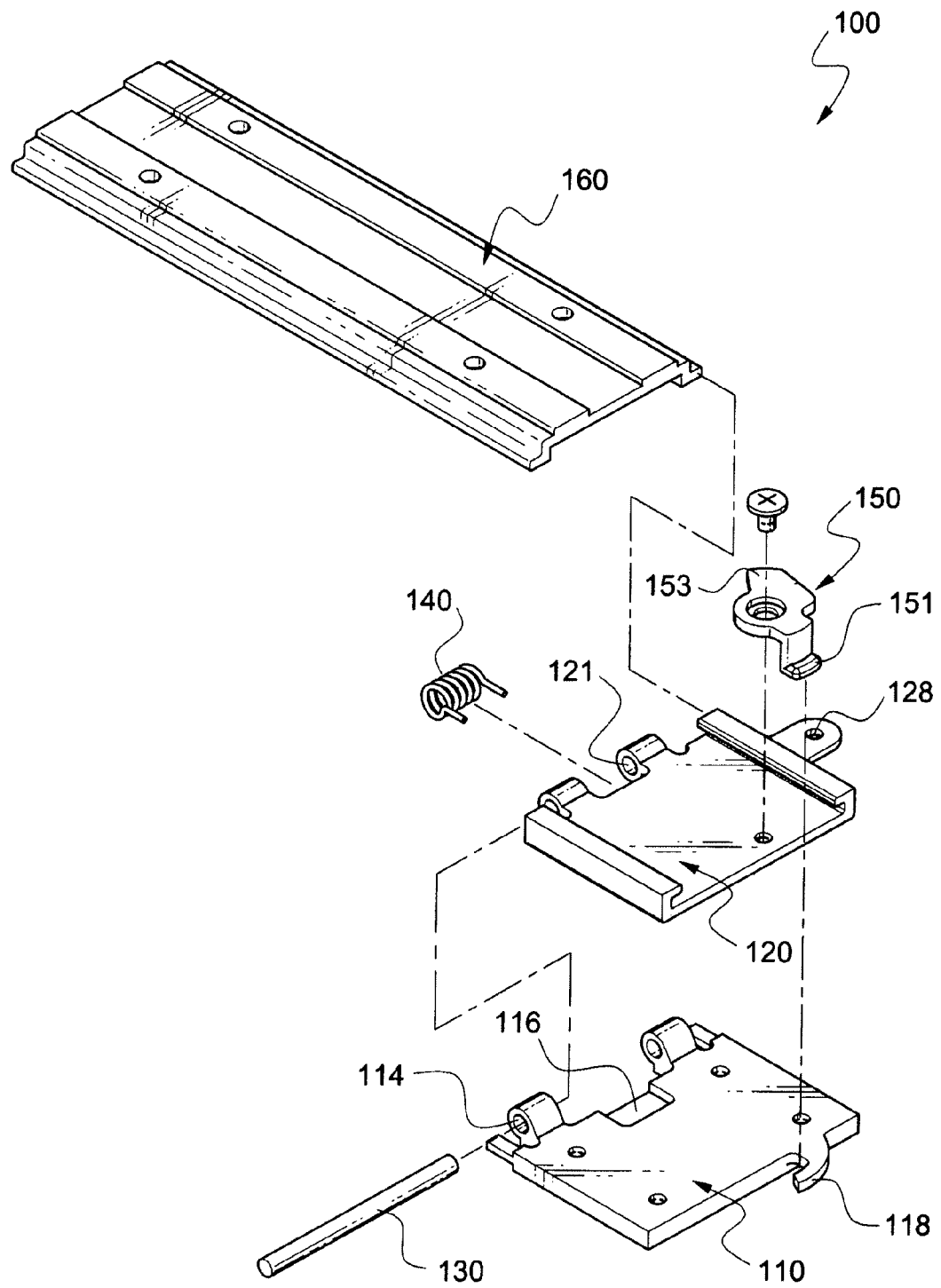
FIG. 16 is an exploded perspective view of a slide hinge device according to another embodiment of the present invention.

FIG. 16 is an exploded perspective view of a slide hinge device according to another embodiment of the present invention.

As the case may be, it is possible that the second through hole is not formed on the connecting member 110 and guide member 120, that the swing member 150 is disposed at the end portion of the guide member 120, and that the locking part 118 is formed at the end of the connecting member 110. Therefore, the locking jaw 151 is locked in the locking part 118 according to a rotational angle of the swing member 150 so that the locking jaw 151 is locked or released so as to allow the guide member 120 to be unfolded from the connecting member 110.

Also, as the case may be, it is possible that the locking part 118 extends toward an upper surface of the guide member 120. In this case, it is not necessary that the locking jaw 151 longitudinally extends downward as shown in FIG. 16.

The maintaining operations are the same as operation described above through FIGS. 1 to 9.

Figure 17:
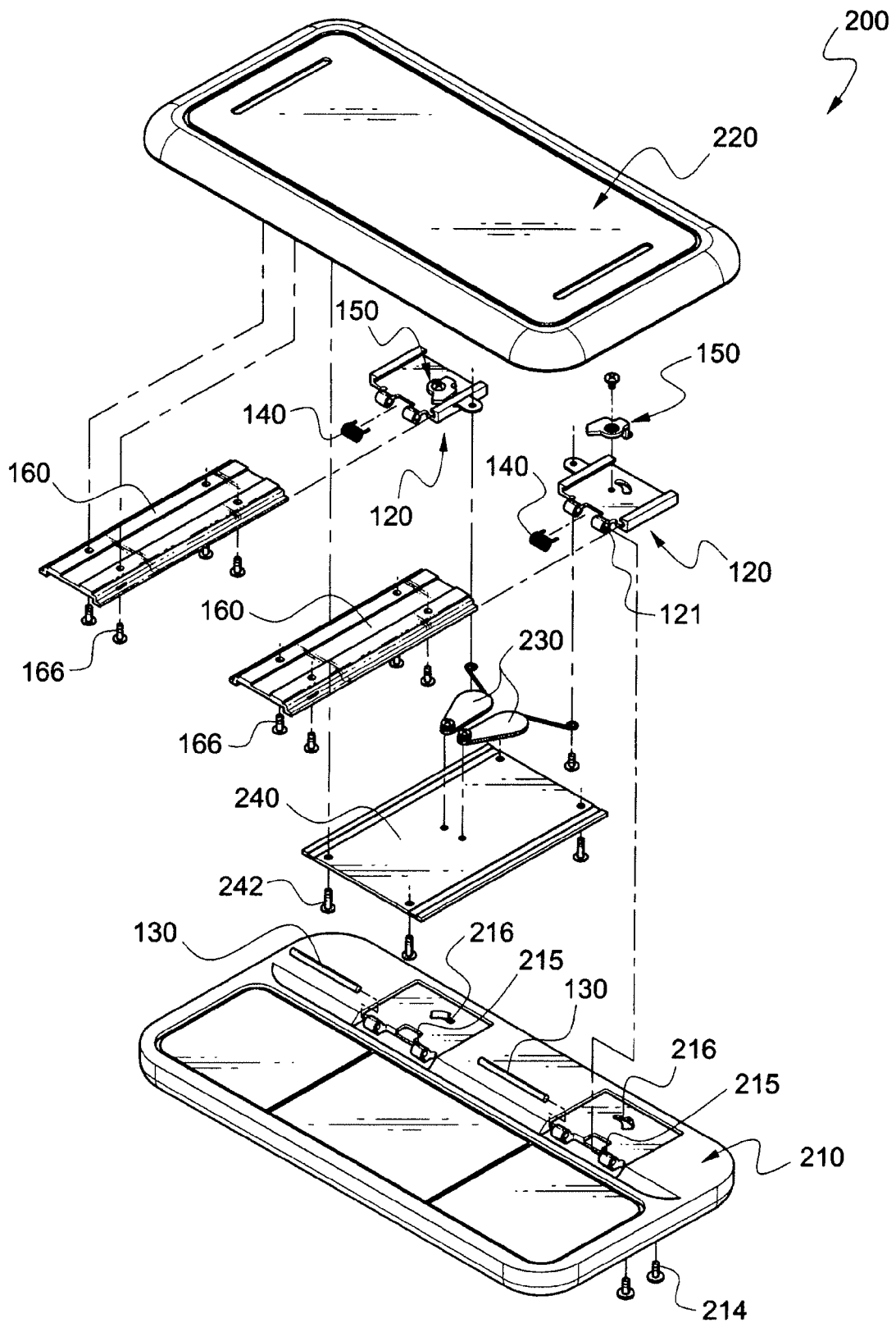
FIG. 17 is an exploded perspective view of a slide hinge device according to another embodiment of the present invention.

FIG. 17 is an exploded perspective view of a slide hinge device according to another embodiment of the present invention.

As the case may be, it is possible that a hinge part 215 is integrally formed at a body, such as the first body part 210 of the slide-type device 200, etc. without the connecting member described in the previous embodiment, and a locking part 216 is formed at one side thereof so as to implement the present invention.

In this case, by using the hinge shaft 130 and the hinge spring 140, the guide member 120 can be rotatably installed at the hinge part 215. The maintaining operations are the same as above description.

As described above, in the slide hinge module and the slide-type device according to the present invention, which the slide member is moved along the guide member, the locking jaw catches the torque of the hinge spring so that scratches or large amounts of frictional force are not generated. Therefore, the sliding operation of the slide member can be smoothly performed.

Accordingly, the slide-type device according to the present invention has excellent operational convenience according to slide movement, a long life span, and can prevent malfunction.

Additionally, the slide hinge module and the slide-type device according to the present invention secures quality improvement of PDAs, mobile telephones, mobile game machines, electronic note books, etc.

What is claimed is:

1. A slide hinge module comprising:
   a hinge assembly, in which a connecting member having a locking part and a guide member having a guide part are foldably assembled with each other, and elastic force is exerted to the hinge assembly in a direction where the connecting member and the guide member are unfolded from each other by an elastic member;
   a slide member assembled with the guide part so as to slide, the slide member having one end at which a swing operating part is formed; and
   a swing member including a locking jaw which is rotatably installed at the guide member and is locked in the locking part or is released from the locking part according to a rotational angle, the swing member including a swing-trigger part, which is locked in the swing operating part according to a movement position of the slide member and is rotated so as to allow the locking jaw to be released from the locking part, or is released from the swing operating part and is rotated in an inverse direction so as to allow the locking jaw to be locked in the locking part.

2. The slide hinge module as claimed in claim 1, wherein a first through hole is formed at the connecting member, the locking part is formed at one side of the through hole, a second through hole is formed at the guide member so as to allow the swing member to pass through the second through hole to be positioned toward the connecting member, the connecting member and the guide member are assembled with each other in such a manner that they can rotate about a hinge shaft, and the connecting member and the guide member are provided with elastic force in a direction where they are unfolded from each other by means of a hinge spring installed at the hinge shaft.

3. The slide hinge module as claimed in claim 2, wherein, as the one end of the slide member reaches the guide member so that the swing-trigger part is locked in the swing operating part so as to be rotated, the swing member allows the locking jaw to be released from the locking part so as to be in a unfold angle state where the guide member to be unfolded from the connecting member, and the slide member is moved after the guide member is folded on the connecting member due to external force in the unfold angle state, the swing-trigger part rotates in an inverse direction while being released from the swing operating part so as to allow the locking jaw to be locked in the locking part to be in a locking angle state so that a state where the guide member is folded on the connecting member is maintained, and as a result, the slide member can slide along the guide part regardless of an effect of force exerted by the hinge spring.

4. The slide hinge module as claimed in claim 1, wherein the guide part is a T-shaped groove, the swing member is installed in such a manner that the swing member can rotate about a rotational shaft perpendicular to the guide member, and the swing operating part is formed at a side wall of the slide member, the side wall extending toward the guide member.

5. The slide hinge module as claimed in claim 2, wherein the guide part is a T-shaped groove, the swing member is installed in such a manner that the swing member can rotate about a rotational shaft perpendicular to the guide member, and the swing operating part is formed at a side wall of the slide member, the side wall extending toward the guide member.

6. The slide hinge module as claimed in claim 3, wherein the guide part is a T-shaped groove, the swing member is installed in such a manner that the swing member can rotate about a rotational shaft perpendicular to the guide member, and the swing operating part is formed at a side wall of the slide member, the side wall extending toward the guide member.

7. A slide-type device comprising:

a first body part;

a second body part, which can slide on the first body part in parallel, the second body part can be bent with a slant respective to the first body part at one end of first body part;

a hinge assembly, in which a connecting member and a guide member are foldably assembled with each other, the connecting member having a locking part formed thereon, the guide member having a guide part formed thereon, and elastic force is exerted to the hinge assembly in a direction where the connecting member and the guide member are unfolded from each other by an elastic member;

a slide member, which is connected with the second body and is assembled with the guide part so as to slide, the slide member having one end at which a swing operating part is formed; and a swing member including a locking jaw, which is rotatably installed at the guide member and is locked in the locking part or is released from the locking part according to a rotational angle, the swing member including a swing-trigger part, which is locked in the swing operating part according to a movement position of the slide member and is rotated so as to allow the locking jaw to be released from the locking part, or is released from the swing operating part and is rotated in an inverse direction so as to allow the locking jaw to be locked in the locking part.

8. The slide-type device as claim in claim 7, wherein the connecting member and guide member are rotatably assembled with each other by means of a rotating shaft, and the connecting member and the guide member are provided with elastic force in a direction where they are unfolded from each other by means of a hinge spring installed at the hinge shaft.

9. The slide-type device as claim in claim 8, wherein, as the one end of the slide member reaches the guide member so that the swing-trigger part is locked in the swing operating part so as to be rotated, the swing member allows the locking jaw to be released from the locking part so as to be in a unfold angle state where the guide member to be unfolded from the connecting member, when the slide member is moved after the guide member is folded on the connecting member due to external force in the unfold angle state, the swing-trigger part rotates in an inverse direction while being released from the swing operating part so as to allow the locking jaw to be locked in the locking part to be in a locking angle state so that a state where the guide member is folded on the connecting member is maintained, and as a result the slide member can slide along the guide part regardless effect of force exerted by the hinge spring.

10. The slide-type device as claimed in claim 7, wherein the slide member is integrally formed at the second body part.

11. The slide-type device as claimed in claim 8, wherein the slide member is integrally formed at the second body part.

12. The slide-type device as claimed in claim 9, wherein the slide member is integrally formed at the second body part.

13. The slide-type device as claimed in claim 7, wherein the guide part is a T-shaped groove, the swing member is installed in such a manner that the swing member can rotate about a rotational shaft perpendicular to the guide member, and the swing operating part is formed at a side wall of the slide member, the side wall extending toward the guide member.

14. The slide-type device as claimed in claim 8, wherein the guide part is a T-shaped groove, the swing member is installed in such a manner that the swing member can rotate about a rotational shaft perpendicular to the guide member, and the swing operating part is formed at a side wall of the slide member, the side wall extending toward the guide member.

15. The slide-type device as claimed in claim 9, wherein the guide part is a T-shaped groove, the swing member is installed in such a manner that the swing member can rotate about a rotational shaft perpendicular to the guide member, and the swing operating part is formed at a side wall of the slide member, the side wall extending toward the guide member.

16. The slide-type device as claimed in claim 7, wherein a torsion spring for pushing the first body part in a first direction or a second direction according to a movement position of the slide member is installed between the guide member and the second body part.

17. The slide-type device as claimed in claim 8, wherein a torsion spring for pushing the first body part in a first direction or a second direction according to a movement position of the slide member is installed between the guide member and the second body part.

18. The slide-type device as claimed in claim 9, wherein a torsion spring for pushing the first body part in a first direction or a second direction according to a movement position of the slide member is installed between the guide member and the second body part.

19. The slide-type device as claimed in claim 7, wherein a pair of hinge assemblies, a pair of slide members, and a pair of swing members are installed with an interval.

20. The slide-type device as claimed in claim 8, wherein a pair of hinge assemblies, a pair of slide members, and a pair of swing members are installed with an interval.

21. The slide-type device as claimed in claim 9, wherein a pair of hinge assemblies, a pair of slide members, and a pair of swing members are installed with an interval.

* * * * *